Jan. 10, 1967  R. C. TURNBLADE ETAL  3,296,870
FORCE SENSING DEVICE
Filed Jan. 8, 1964  2 Sheets-Sheet 1

INVENTORS.
RICHARD C. TURNBLADE
BY THOMAS R. EDMONDS

*Isadore Togut*
ATTORNEY

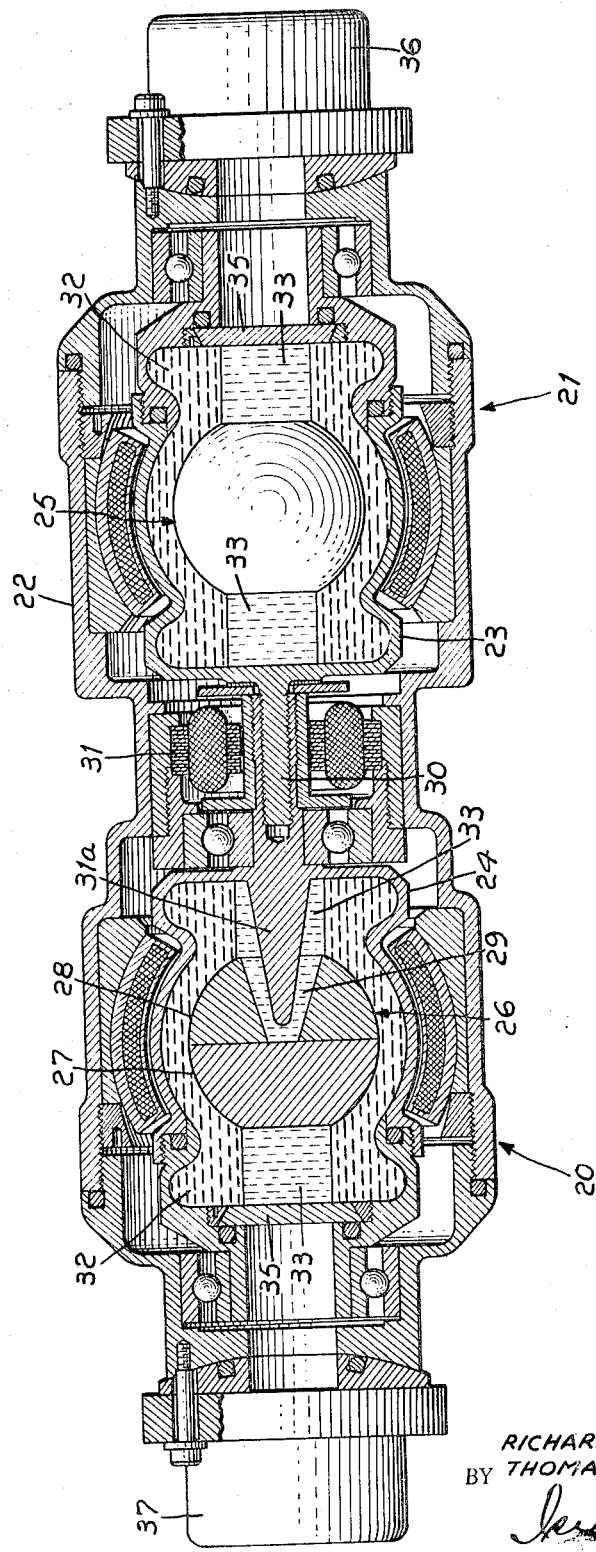

United States Patent Office 3,296,870
Patented Jan. 10, 1967

3,296,870
FORCE SENSING DEVICE
Richard C. Turnblade, Sepulveda, and Thomas R. Edmonds, Woodland Hills, Calif., assignors to International Telephone and Telegraph Corporation, Nutley, N.J., a corporation of Maryland
Filed Jan. 8, 1964, Ser. No. 336,561
11 Claims. (Cl. 73—504)

This invention relates to a highly accurate force sensing device and more particularly to gyroscopes and accelerometers and combination thereof.

In the operation of high-speed aircraft, guided missiles or pilotless aircraft and the like, it is desirable to provide means which indicate the deviation of the aircraft from its desired path and which also indicate the acceleration forces acting on the aircraft in order to properly control the flight of the aircraft to its desired objective. Such means must provide reliable and accurate information. In the present state of the art as generally known, gyroscopes and accelerometers are separate instruments and are also very expensive to produce particularly where accuracy of a very high order is required. It is very desirable and necessary for such devices as the gyroscope and the accelerometer to be produced as economically as possible and to occupy the least possible space in the aircraft.

It is known in the art to utilize fluid means such as oil or gas to support the moving member of a gyroscope or accelerometer by hydrostatic or hydrodynamic techniques. However, it has not been possible to utilize the buoyance effect of a member suspended in a fluid vortex to completely support the member in all three dimensions because of the fact that there is no support for the member in the direction parallel to the axis of rotation (the vortex axis), that is, there is no longitudinal load support.

It is therefore an object of this invention to provide a force sensing device wherein the moving member is buoyantly fluid supported and has longitudinal load support, i.e., three dimensional support.

It is another object to provide a gyroscope wherein the moving member is buoyantly fluid supported and has longitudinal load support, i.e., three dimensional support.

It is still another object to provide an accelerometer wherein the moving member is buoyantly fluid supported and has longitudinal load support, i.e., three dimensional support.

It is a further object of this invention to provide a single device which combines the function of the gyroscope and the accelerometer having accuracy of an extremely high order and the moving member is buoyantly fluid supported and has longitudinal load support, i.e., three dimensional support.

Another object is to provide an accelerometer of the pendulous type wherein the moving member is buoyantly fluid supported and has longitudinal load support, i.e., three dimensional support.

This invention is disclosed in a novel device which can be used as a gyroscope or accelerometer and which can also be combined in one unit to demonstrate both the functions of the highly accurate gyroscope and accelerometer. The rotor is equally adaptable to serve both the functions of the gyroscope and the accelerometer even though the sensing means for the gyroscopic function and for the accelerometer functions are distinct as will be shown when the invention is described in detail.

A feature of this invention is a device which comprises in combination a case, means to rotate the case, a rotor supported radially from the axis of rotation by first fluid means contained within the case and means for supporting the rotor in the direction parallel to the axis of rotation.

Another feature is that the means for supporting the rotor in the direction parallel to the axis of rotation comprises another fluid means, the density of which is less than the density of the fluid means which radially support the rotor within the case.

Still another feature is that in the combination device, the rotor is spherical at one surface and oblate at the other end opposite the spherical surface, the axis of rotation passing through both the oblate and the spherical surfaces. Optical sensing means for sensing the gyroscope precession is disposed adjacent the oblate portion while the accelerometer sensing means is disposed adjacent the spherical portion of the rotor.

The above-mentioned and other features and objects of this invention will become more apparent by reference to the following description taken in conjunction with the accompanying drawings, in which:

FIGURE 5 is a cross-sectional view of another embodiment of this invention which discloses a two axis gyroscope and a two axis accelerometer in one package.

Figure 1:
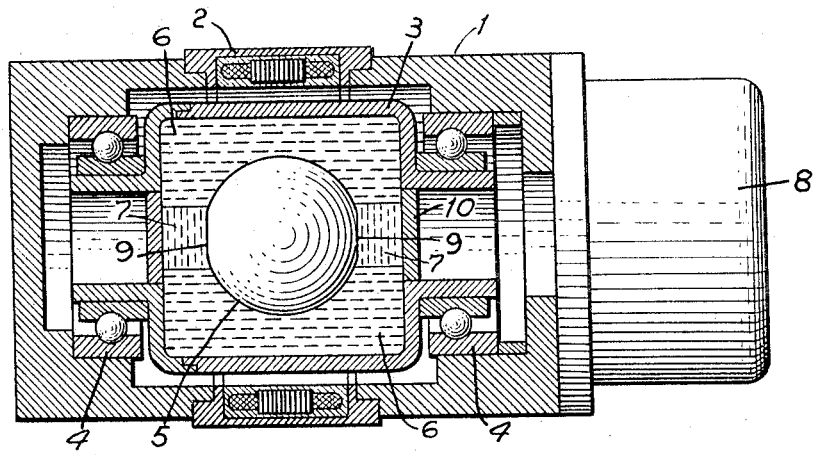
FIGURE 1 is a cross-sectional view of an embodiment of this invention.

With reference to FIGURE 1, there is shown the basic force sensing device of this invention which consists of an outer case 1 and a drive motor 2 disposed within the outer case 1 for rotating the inner case 3. The means for rotating the inner case 3 are conventional and could comprise, for example, windings disposed in the outer case 1 to create a flux field which would rotate inner case 3. The choice of means for driving the inner case 3 can be made from any methods known in the art. The rotating case 3 is supported from the outer case 1 by ball bearings 4 but the lubrication of the rotating case 3 can be done by any methods known in the art. Disposed within the rotating case 3 is a spherical rotor 5 which is supported for rotation within the rotating case 3 by means of a flotation fluid 6 whose density exceeds that of the rotor 5. The illustration of FIGURE 1 shows the force sensing device in the rotating mode with the rotor 5 supported for rotation about the axis of rotation of the rotating case 3. Disposed within the rotating case 3 and about the axis of rotation, are two pockets or cylinders 7 of an intermediate fluid which is lighter than the flotation fluid 6. Disposed about the axis of rotation of the rotor 5 and the rotating case 3 and at the end thereof is an optical pick-off 8. The rotor 5 is completely spherical except for the oblate surfaces 9 which are disposed opposite each other and normal to the axis of rotation. The inside of rotating case 3 is sealed by means of transparent plug 10 to retain the flotation fluid and the intermediate fluid.

The flotation fluid 6 because of rotation of the inner case 3 is caused by centrifugal forces to seek the spaces of the rotating case 3 farthest from the center. The rotor which is lighter than the flotation fluid is driven to the center of the rotating case and is supported there by centrifugal forces exerted by the flotation fluid. The intermediate fluid 7 in the rotating case is lighter than the flotation fluid and is also forced to the center of the vortex by centrifugal force. The purpose of the intermediate fluid is twofold. First by arranging the geometry of the inner surface of the rotating case 3, so that the rotor steady state position has pockets 7 of intermediate fluid on both sides of the rotor, a capacity for force support of the rotor along the rotational axis is developed. Without the intermediate fluid the rotational nature of the gyro rotating case 3 damps but does not prevent the motion of the gyro rotor along the axis of rotation. Therefore, the device would not be worthwhile in any application unless support for the rotor is provided in the direction of the axis of rotation. The intermediate fluid which is lighter than the flotation fluid must be displaced radially if the rotor is to move in the direction of the axis of rotation. This displacement requires that the heavy flotation fluid be moved radially outward in response to rotor motion and this requires force. Hence, there is a significant supporting force supplied by the intermediate fluid and constitutes what is called the "fluid spring." The stiffness of this fluid spring can be made comparable with the stiffness of the rotating centrifugal field, if it be so desired. The introduction of the intermediate fluid allows this device to function as a gyroscope, an accelerometer or a combination of both in a realistic environment.

The intermediate fluid also performs the second function in that it allows an optical viewpath of the rotating rotor within the rotating case along the axis of rotation. The choices of the intermediate fluid 7 and the flotation fluid 6 are somewhat arbitrary provided that they meet the conditions that the flotation fluid is more dense than the rotor and the intermediate fluid. For supreme accuracy an example of a suitable flotation fluid is mercury; the rotating case can be made of brass or some heavier metal appropriately coated with a glass or ceramic glaze to protect it from amalgamating with the mercury; and the intermediate fluid could be a gas such as air, dried nitrogen or helium. By observing the rotating case through the column of intermediate fluid, it is possible to obtain a measure of acceleration and inertial stability in the rotor.

Figure 2:
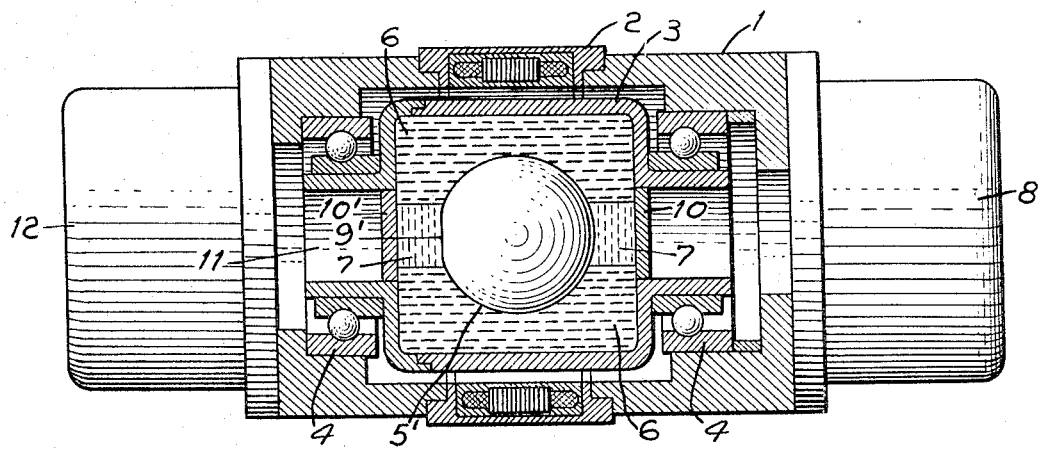
FIGURE 2 is a cross-sectional view of an embodiment of this invention combining the functions of the gyroscope and accelerometer in one package.

Referring now to FIGURE 2 there is shown the combination gyroscope-accelerometer of this invention which is similar to the embodiment of FIGURE 1, but additionally has a second pickoff and only one oblate surface 9'. The surface of the rotor 5' opposite the oblate surface 9' is spherical. A second transparent plug 10' seals off the inside of rotating case 3' from the cavity 11 through which the optical viewing of the oblate surface 10' is effected by optical pickoff 12. The inertial stability of the rotor is sensed by the angular deflection of a light beam directed against the oblate surface and reflected back to the optical pickoff 12. The acceleration forces acting on the rotor is sensed by the angular deflection of a light beam directed against the spherical surface opposite the oblate surface and reflected back to the optical pickoff 8.

Figure 3:
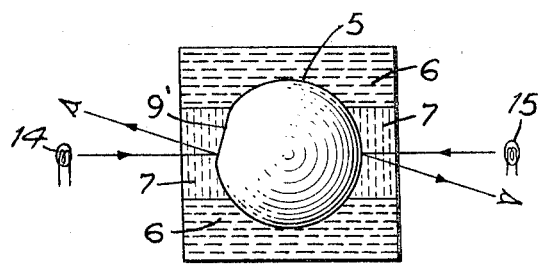
FIGURE 3 is a partial view of the rotor and supporting fluid to illustrate the operation of the sensing procedure for the gyroscope and accelerometer functions.

With reference to FIGURE 3, there is illustrated the manner in which a measure of acceleration and inertial stability is obtained by looking down the column of intermediate fluid. Inertial stability can be determined by looking down through the intermediate fluid 7 at the oblate side 9' of the gyro rotor 5 to determine inertial stability. On the oblate side of the rotor there is indicated a flat mirror which by shining collimated light from a source 14 down the axis of rotation will indicate by reflection of that beam any angular mismatch between the gyro rotor 5 and the rotating case 3 of this device. This information is a direct measure of the stability in inertial space of the outer case and can be used in a servo-system to reposition a platform so as to keep an inertial reference. On the right hand side of the rotor on the surface thereof is indicated a spherical mirror. If the rotor is caused to move up or down in response to acceleration perpendicular to the axis of rotation there will be a deflection of a collimated light beam from the source 15 traveling down the column of intermediate fluid 7 and the angle of deflection is proportional to the distance up or down that the gyro rotor has moved from the centered position.

In the same manner, it is possible to provide acceleration information for the other orthogonal axes. This is a linear measure of the acceleration being experienced by this device. Thus, by making a rotor with a flat mirror on one side and a spherical mirror on the other and by placing pickoffs 12 and 8 at each end, it is possible to measure simultaneously inertial stability and acceleration. Furthermore, there is no crosstalk interference between the gyroscopic and acceleration measurements because of the completely independent sensing techniques. This invention provides both a two axis gyroscope and a two axis accelerometer in the same package, and provides an extremely versatile device which is in many applications capable of replacing four conventional gyros and accelerometers. It is to be understood, of course, that this device can be made as a gyroscope only or as an accelerometer only as well as a combination of both.

Figure 4:
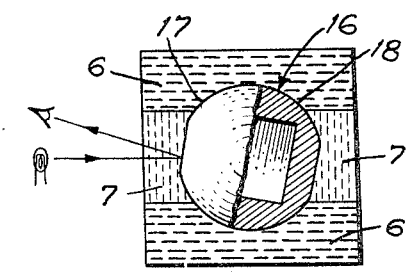
FIGURE 4 is an embodiment of this invention used as a pendulous accelerometer.

In FIGURE 4 there is shown an embodiment of our invention utilized as a pendulous accelerometer with great sensitivity and accuracy. In this device, the rotor 16 is made of two hemispheres. One hemisphere 17 is shown solid, and would be made of a very heavy material, perhaps tungsten or titanium. The other hemisphere 18 has a hollow core and would be made of a very light material, for example, aluminum. These two materials are mated together and given a coating of a ceramic glaze so as to protect them from the amalgamation which would occur from the flotation fluid 7, which in this case would be mercury. The intermediate fluid in this case would be a gas, such as dried nitrogen or helium.

Because of the pendulous nature of the device whenever an acceleration is sensed, the rotor 16, because of its great imbalance would be caused to precess. However, it can only precess so far before the viscous coupling of the mercury would equate to the unbalanced torque caused by acceleration. The equilibrium position would then be angularly offset from a null position of zero acceleration and the magnitude of the angle is a direct linear measure of acceleration. It is to be understood, of course, that the device can be made of a variety of materials but the materials described in this case are those to make an accelerometer of unprecedented accuracy. The thresholds of this device are several orders of magnitude better than any known device.

In FIG. 5 there is shown a dual pendulous accelerometer 20 and gyroscope 21. Both units are enclosed in an outer case 22 about a common axis of rotation. The inner rotating case 23 of the gyroscope 21 is integral with the inner rotating case 24 of the accelerometer 20. The rotor 25 of the gyroscope 21 is a completely balanced rotor. The rotor 26 of the accelerometer 20 is pendulous and is the acceleration sensor. The rotor 26 is fabricated of two different metallic materials as previously described. The heavy end 27 is made of tantalum and the lighter end 28 is made of aluminum and has a conical cavity 29 along the rotating axis. Both rotating cases 23 and 24 are rigidly connected at 30 which is the armature of a motor adjacent to which is disposed the field coil 31 for driving the motor. The armature 30 has a conical extension 31a, the end portion of which is disposed in the conical cavity 29. Disposed within each rotating case is flotation fluid 32 and pockets or cylinders 33 of the intermediate fluid. Two windows 35 seal the rotating cases 23 and 24 and provide an optical path for the optical sensing devices 36 and 37 for the gyroscope and accelerometer, respectively. The rotating cases are supported for rotation by ball bearings. The ends of the accelerometer and gyroscope rotors facing the optical sensing devices 37 and 36 have mirror surfaces for optical sensing.

The conical extension 31a of the rotating case extending into the conical cavity of the accelerometer rotor 28 is a caging device that prevents the accelerometer rotor from exposing the wrong end of the rotor to the optical pickoff 37. If the rotor had a mirror on each end and was not restrained angularly, a 180° tumble of the rotor would reverse its pendulosity. The direction of precession caused by acceleration torques on the pendulous rotor would reverse direction depending upon which mirror was facing the pickoff. This condition of ambiguity is troublesome to the design of a stable control loop for force balance torquing. The conical extension of the armature prevents this anomalous condition from occurring by permanently preventing the rotor from tumbling. The gyroscope rotor has the same angular momentum vector regardless of which mirror faces the pickoff and therefore, there is no 180° ambiguity difficulty.

In the combination of FIG. 5, the rotor on the left is pendulous and performs as the acceleration sensor. The gyroscope on the right incorporates a balanced rotor and performs as a rate sensor. The need for a rate gyroscope evolves whenever the pendulous accelerometer is mounted on a platform that is not inertially stabilized. If the left-hand portion of FIG. 5 were used alone as a single pendulous accelerometer and mounted on a base which is caused to rotate in inertial space, the rotating case of the accelerometer would rotate with the base and the gyroscopic stability of the pendulous rotor, which has angular momentum, would cause the rotor to attempt to maintain its original inertial position. Viscous forces will eventually constrain the rotor from moving far out of alignment; however, there will be angular divergence between the rotating axis of the rotor and the rotating case. Since an acceleration causes the rotor to tilt with respect to the case, the accelerometer output interprets angular misalignment due to rotation as an acceleration. Therefore, a vehicular rate will be seen as an acceleration error. In consequence, if a single pendulous accelerometer 20 is not mounted on an inertially stabilized platform, it is necessary to provide corrections for rate inputs. The gyroscope 21 of FIG. 5 supplies the necessary correction data. This gyroscope incorporates a completely balanced rotor with no pendulous sensitivity to external accelerations. Any angular divergence between the angular velocity vectors of the rotor and the rotating case is caused solely by angular velocities of the base upon which the unit is mounted. The pendulous accelerometer rotor and the gyroscope rotor have the same angular momentum. Therefore, the pickoff output of the rate gyroscope reflects precisely that portion of the accelerometer output which is caused by vehicular rate inputs. By subtracting the outputs of the accelerometer and the rate gyroscope and examining the residual information, only acceleration information remains.

It is possible to separate the two units of the combined accelerometer-gyroscope of FIG. 5 and in that case, undesirable angular momentum effects can be eliminated by a counter rotating orientation. By combining the two in one package, there is saved the power inefficiencies of a second motor.

While we have described above the principles of our invention in connection with specific apparatus, it is to be clearly understood that this description is made only by way of example and not as a limitation to the scope of our invention as set forth in the objects thereof and in the accompanying claims.

We claim:
1. A force sensing device comprising:
an outer case,
an inner case supported for rotation within said outer case,
means to rotate said inner case,
a spherical rotor disposed within said inner case for rotation therein about the axis of rotation of said inner case,
first fluid means having a density greater than that of said rotor supporting said rotor from said inner case for rotation therein about said axis of rotation of said inner case,
second fluid means having a density less than that of said first fluid means supporting said rotor from said inner case in the direction of said axis of rotation, and
optical means disposed adjacent one surface of said rotor concentric with said axis of rotation to sense acceleration forces exerted upon said rotor perpendicular to the axis of rotation thereof.

2. A force sensing device as in claim 1 wherein said spherical rotor is unbalanced.

3. A force sensing device as in claim 2 wherein said rotor surface adjacent said optical means is flat and is normal to said axis of rotation.

4. A force sensing device as in claim 2 wherein said rotor is composed of hemispherical sections and one section is heavier than the other.

5. A force sensing device as in claim 4 wherein the lighter hemispherical section is hollow.

6. A combination gyroscope and accelerometer comprising:
an outer case,
an inner case supported for rotation within said outer case,
means to rotate said inner case,
a spherical rotor disposed within said inner case for rotation therein about the axis of rotation of said inner case, said rotor having an oblate portion on one end of the rotor about said axis and normal thereto, the other end of the rotor opposite said oblate surface being spherical,
first fluid means having a density greater than that of said rotor supporting said rotor from said inner case for rotation therein,
second fluid means having a density less than that of said first fluid means supporting said rotor from said inner case in the direction of the axis of rotation,
first optical means disposed adjacent said oblate surface to sense the inertial stability of said rotor, and
second optical means disposed adjacent the spherical surface of said rotor opposite said oblate surface to sense acceleration forces exerted upon said rotor perpendicular to the axis of rotation thereof.

7. A combination gyroscope and accelerometer comprising:
an outer case,
an inner case supported for rotation within said outer case, said inner case having first and second compartments,
means to rotate said inner case,
a first spherical rotor disposed within said first compartment for rotation about the axis of rotation of said inner case,
a second spherical rotor disposed within said second compartment for rotation therein about the axis of rotation of said inner case,
first fluid means having a density greater than that of said rotors supporting each said rotor from said inner case for rotation therein,
second fluid means having a density less than that of said first fluid means supporting each said rotor from said inner case in the direction of the axis of rotation,
first optical means disposed adjacent said first rotor to sense the inertial stability of said rotor, and
second optical means disposed adjacent said second rotor to sense acceleration forces exerted upon said rotor.

8. A combination gyroscope and accelerometer according to claim 7 wherein said first rotor is a balanced rotor and has oblate portions at each end of the rotor about said axis and normal thereto, and said second rotor is an unbalanced rotor.

9. A combination gyroscope and accelerometer according to claim 8 wherein said second rotor is composed of hemispherical sections and the first section is heavier than the second section.

10. A combination gyroscope and accelerometer according to claim 9 wherein said first section is solid and said second section has a conical cavity.

11. A combination gyroscope and accelerometer according to claim 10 wherein said inner case comprises a conical extension adjacent said second section of said balanced rotor and said conical extension extends inwardly of said conical cavity.

References Cited by the Examiner

UNITED STATES PATENTS

| | | |
|---|---|---|
| 1,890,831 | 12/1932 | Smyth. |
| 2,613,538 | 10/1952 | Edelstein _____ 74—5.37 |
| 2,919,583 | 1/1960 | Parker. |
| 2,936,624 | 5/1960 | Schalkowsky et al. ____ 73—516 |
| 2,963,285 | 12/1960 | Fischer et al. _____ 73—516 |
| 3,142,990 | 8/1964 | Aske _____ 73—503 X |
| 3,142,991 | 8/1964 | Pittman _____ 73—504 |

JAMES J. GILL, *Acting Primary Examiner.*